United States Patent
Kurosawa (12)

(10) Patent No.: US 6,330,310 B1
(45) Date of Patent: Dec. 11, 2001

(54) DIRECTORY DIALING TELEPHONE SET

(75) Inventor: Shigeru Kurosawa, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/193,574

(22) Filed: Nov. 17, 1998

(30) Foreign Application Priority Data

Nov. 19, 1997 (JP) .................................................. 9-318448

(51) Int. Cl.⁷ .................................................. H04M 15/00
(52) U.S. Cl. ............... 379/111; 379/127.01; 379/142.04; 379/142.17; 379/88.19; 379/88.2; 379/88.21; 379/93.23
(58) Field of Search ............................. 379/93.23, 93.25, 379/93.27, 100.02, 100.14, 111–115, 156–157, 355, 142

(56) References Cited

U.S. PATENT DOCUMENTS

| | | | |
|---|---|---|---|
| 5,034,976 | * 7/1991 | Sato | 379/113 |
| 5,438,612 | * 8/1995 | Norimatsu | 379/111 |
| 5,592,546 | * 1/1997 | Takahashi | 379/355 |
| 6,009,158 | * 12/1999 | Romero | 379/142 |

FOREIGN PATENT DOCUMENTS

| | | |
|---|---|---|
| 0463582 | 1/1992 | (EP) . |
| 63-278451 | 11/1988 | (JP) . |
| 64-90654 | 4/1989 | (JP) . |
| 3-23747 | 1/1991 | (JP) . |
| 4-284772 | 10/1992 | (JP) . |
| 9827706 | 6/1998 | (WO) . |

OTHER PUBLICATIONS

Japanese Office Action issued Dec. 7, 1999 in a related application and English–language translation of relevant portions.

* cited by examiner

*Primary Examiner*—Duc Nguyen
(74) *Attorney, Agent, or Firm*—Ostrolenk, Faber, Gerb & Soffen, LLP

(57) ABSTRACT

A directory dialing telephone set, with which the user can register necessary telephone numbers in a directory of the directory dialing telephone set efficiently and with a minimum of effort, is presented. For example, a telephone number dialed by the user for calling or a telephone number of a calling party which is informed via the telephone network (i.e. a current telephone number) is stored one by one in a telephone number temporary storage section which can store a predetermined number of telephone numbers. The number of the current telephone numbers which exist in the telephone number temporary storage section is counted by a counter section, and inquiry to the user (asking the user whether or not the user intends to store the current telephone number in the directory which is provided in a directory storage section of the directory dialing telephone set) is executed only in the case where the number of the current telephone numbers stored in the telephone number temporary storage section is larger than a predetermined threshold number T and the current telephone number has not been stored in the directory storage section yet. The current telephone number is stored in the directory of the directory storage section if the user requested to store the current telephone number by pushing a storage button.

6 Claims, 4 Drawing Sheets

DIRECTORY DIALING TELEPHONE SET

BACKGROUND OF THE INVENTION

The present invention relates to a directory dialing telephone set which is provided with a directory for storing a plurality of telephone numbers and which has functions for executing calling or dialing of a telephone number in a telephone network which has been stored in the directory.

DESCRIPTION OF THE PRIOR ART

These days, many of the telephone sets on the market are provided with functions for storing a plurality of telephone numbers in a directory and executing dialing (calling) of a telephone number which has been stored in the directory (hereafter, such a telephone set will be referred to as a "directory dialing telephone set"). The user selects a telephone number from the directory and dials the selected telephone number with easy operation such as pushing one or more buttons.

When a telephone number should be registered in the directory of such a directory dialing telephone set, the user usually selects a registration mode of the telephone set, which is different from the ordinary mode for conversation, by pushing a button etc. Meanwhile, as disclosed in Japanese Patent Application Laid-Open No.SH063-278451, there has been proposed a directory dialing telephone set which is provided with functions for registering telephone numbers in its directory semi automatically. The telephone numbers which are registered by the directory dialing telephone set include telephone numbers which have been dialed by the user for calling and telephone numbers of calling parties (i.e. calling numbers) which have been informed by the telephone network in services such as "calling number identification presentation" etc. The directory dialing telephone set inquires of the user whether or not the user intends to register the telephone number (i.e. the telephone number which the user dialed or the telephone number of a calling party which has been informed by the telephone network) if the telephone number has not been registered in the directory yet. The inquiry is executed by the directory dialing telephone set on each telephone call (calling and reception of a call), and the telephone number is registered in the directory if the user intended to register the telephone number and requested the registration by pushing a button etc.

However, such a directory dialing telephone set executes the inquiry depending on the result of the simple judgment on whether or not the current telephone number (i.e. the telephone number which has just been dialed by the user for calling or the telephone number of a calling party which has just been informed by the telephone network) has already been registered in the directory, and thus the inquiry is executed even in the case where the telephone number is dialed by the user very rarely (i.e. even in the case where it is almost clear that the telephone number will not be registered by the user), or even in the case where the user received a call from an undesired calling party.

As described above, conventional directory dialing telephone sets which are provided with functions for registering telephone numbers in their directories require the user to spend time and execute some troublesome operation regardless of the priority of the telephone number.

SUMMARY OF THE INVENTION

It is therefore the primary object of the present invention to provide a directory dialing telephone set provided with functions for registering telephone numbers in its directory, by which the user is released from the troublesome operation with regard to telephone numbers that will not be registered, for example, when the telephone number dialed by the user is a rarely used number, when the user received a call from an undesired calling party, etc., and the user can register necessary telephone numbers in the directory efficiently and with a minimum of effort.

In accordance with a first aspect of the present invention, there is provided a directory dialing telephone set which is provided with a directory storage means for storing a directory including a plurality of telephone numbers and which has functions for executing dialing of a telephone number which has been selected by the user from the telephone numbers stored in the directory storage means, comprising a telephone call frequency judgment means and a directory storage control means. The telephone call frequency judgment means judges whether or not frequency of telephone calls concerning a current telephone number, which have just been dialed by the user or informed via the telephone network, is higher than predetermined frequency. And the directory storage control means executes control concerning storage of the current telephone number in the directory of the directory storage means if the current telephone number has not been stored in the directory of the directory storage means yet and the telephone call frequency judgment means judged that the frequency of telephone calls concerning the current telephone number is higher than the predetermined frequency.

In accordance with a second aspect of the present invention, in the first aspect, the directory storage control means inquires of the user whether or not the user intends to store the current telephone number in the directory of the directory storage means if the current telephone number has not been stored in the directory of the directory storage means yet and the telephone call frequency judgment means judged that the frequency of telephone calls concerning the current telephone number is higher than the predetermined frequency, and stores the current telephone number in the directory of the directory storage means if the user requested to store the current telephone number.

In accordance with a third aspect of the present invention, in the first aspect, the directory storage control means stores the current telephone number in the directory of the directory storage means if the current telephone number has not been stored in the directory of the directory storage means yet and the telephone call frequency judgment means judged that the frequency of telephone calls concerning the current telephone number is higher than the predetermined frequency.

In accordance with a first aspect of the present invention, there is provided a directory dialing telephone set which is provided with a directory storage means for storing a directory including a plurality of telephone numbers and which has functions for executing dialing of a telephone number which has been selected by the user from the telephone numbers stored in the directory storage means, comprising a telephone number temporary storage means, a counter means, a searching means, and a directory storage control means. The telephone number temporary storage means temporarily stores a predetermined number of telephone numbers which have been dialed by the user and telephone numbers of calling parties which have been informed via the telephone network. The counter means counts the number of times of storage of a current telephone number, which have just been dialed by the user or informed via the telephone network, that exist in the telephone number temporary storage means. The searching means searches the directory storage means for the current telephone number and judges whether or not the current telephone number has already been stored in the directory of the directory storage means. And the directory storage control means executes control concerning storage of the current telephone number in the directory of the directory storage means if the number of times which has been counted by the counter means is larger than a predetermined threshold number and the searching means judged that the current telephone number has not been stored in the directory of the directory storage means yet.

In accordance with a fifth aspect of the present invention, in the fourth aspect, the directory storage control means inquires of the user whether or not the user intends to store the current telephone number in the directory of the directory storage means if the number of times which has been counted by the counter means is larger than a predetermined threshold number and the searching means judged that the current telephone number has not been stored in the directory of the directory storage means yet, and stores the current telephone number in the directory of the directory storage means if the user requested to store the current telephone number.

In accordance with a sixth aspect of the present invention, in the fourth aspect, the directory storage control means stores the current telephone number in the directory of the directory storage means if the number of times which has been counted by the counter means is larger than a predetermined threshold number and the searching means judged that the current telephone number has not been stored in the directory of the directory storage means yet.

In accordance with a seventh aspect of the present invention, there is provided a directory dialing telephone set which is provided with a directory storage means for storing a directory including a plurality of telephone numbers and which has functions for executing dialing of a telephone number which has been selected by the user from the telephone numbers stored in the directory storage means, comprising a telephone number temporary storage means, an update means, a counter means, a searching means, and a directory storage control means. The telephone number temporary storage means temporarily stores telephone numbers which have been dialed by the user, telephone numbers of calling parties which have been informed via the telephone network, and time stamps concerning the telephone numbers. The update means updates the telephone numbers and the time stamps stored in the telephone number temporary storage means so as to delete telephone numbers and time stamps which have passed a predetermined period. The counter means counts the number of time stamps concerning a current telephone number, which have just been dialed by the user or informed via the telephone network, that exist in the telephone number temporary storage means. The searching means searches the directory storage means for the current telephone number and judges whether or not the current telephone number has already been stored in the directory of the directory storage means. And the directory storage control means executes control concerning storage of the current telephone number in the directory of the directory storage means if the number of time stamps which has been counted by the counter means is larger than a predetermined threshold number and the searching means judged that the current telephone number has not been stored in the directory of the directory storage means yet.

In accordance with an eighth aspect of the present invention, in the seventh aspect, the directory storage control means inquires of the user whether or not the user intends to store the current telephone number in the directory of the directory storage means if the number of time stamps which has been counted by the counter means is larger than a predetermined threshold number and the searching means judged that the current telephone number has not been stored in the directory of the directory storage means yet, and stores the current telephone number in the directory of the directory storage means if the user requested to store the current telephone number.

In accordance with a ninth aspect of the present invention, in the seventh aspect, the directory storage control means stores the current telephone number in the directory of the directory storage means if the number of time stamps which has been counted by the counter means is larger than a predetermined threshold number and the searching means judged that the current telephone number has not been stored in the directory of the directory storage means yet.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Figure 1:
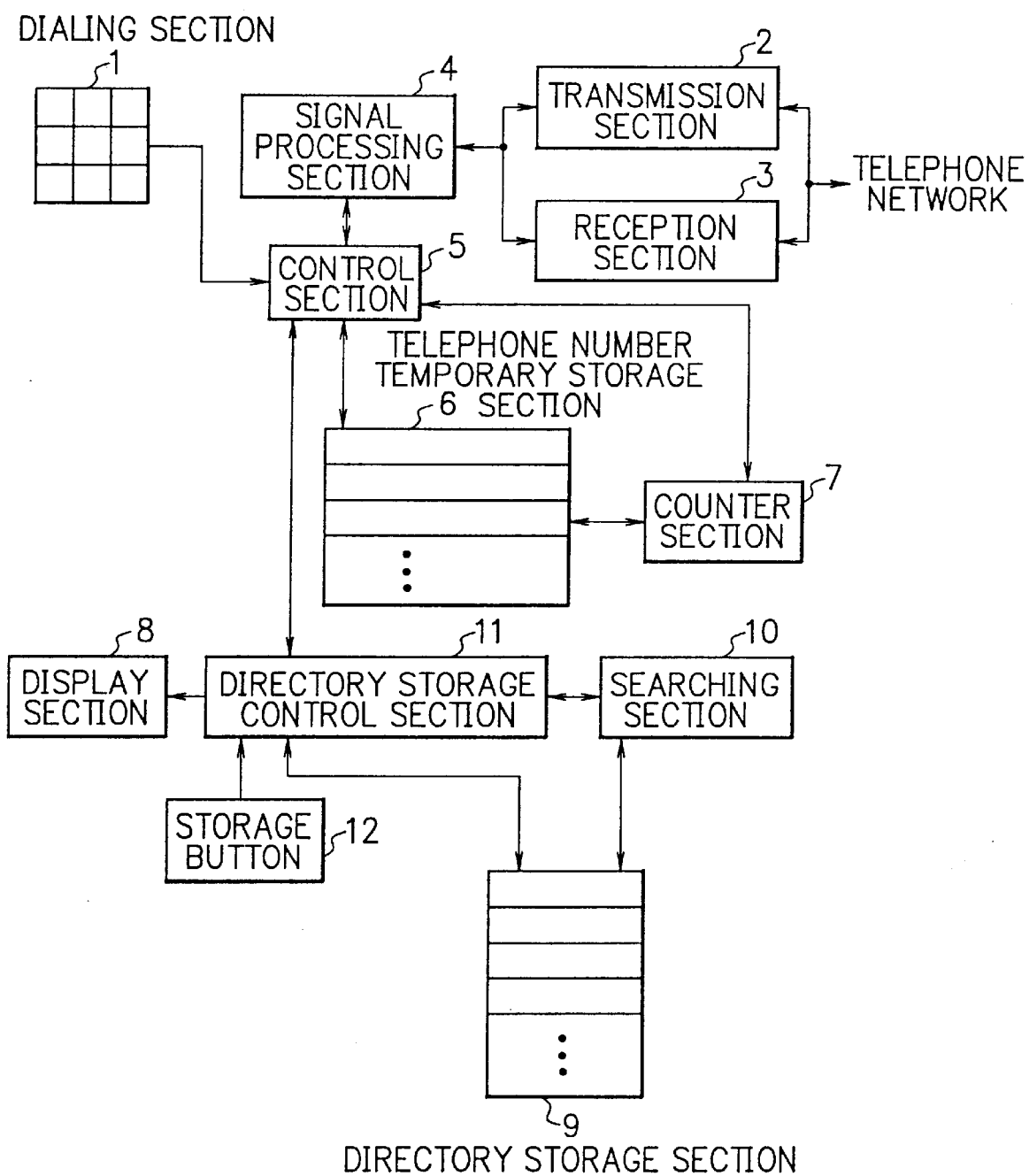
FIG. 1 is a block diagram showing functional blocks of a directory dialing telephone set according to a first embodiment of the present invention concerning storage of telephone numbers.

Referring now to the drawings, a description will be given in detail of preferred embodiments in accordance with the present invention.

FIG. 1 is a block diagram showing functional blocks of a directory dialing telephone set according to a first embodiment of the present invention concerning storage of telephone numbers. The directory dialing telephone set of the first embodiment comprises a dialing section 1 composed of push buttons etc. for letting the user dial telephone numbers, a transmission section 2 for transmitting a telephone number which has been dialed (pushed or selected) by the user into a telephone network, a reception section 3 for receiving a telephone number which has been informed by the telephone network according to a service such as "calling number identification presentation" etc., a signal processing section 4 for executing procedures concerning telephone numbers on calling and reception etc., a control section 5 for controlling components of the directory dialing telephone set, a telephone number temporary storage section 6 for temporarily storing telephone numbers which have been dialed by the user and telephone numbers of calling parties which have been informed by the telephone network, a counter section 7 for counting the number of calling and reception concerning a telephone number by referring to data stored in the telephone number temporary storage section 6, a display section 8 for displaying information such as a telephone number on calling or reception, an inquiry to the user, etc., a directory storage section 9 for storing a directory including a plurality of telephone numbers, a searching section 10 for searching the directory storage section 9, a directory storage control section 11 for executing control concerning storage of telephone numbers in the directory storage section 9, and a storage button 12 for receiving an instruction of the user to store the telephone number in the directory storage section 9.

The telephone number temporary storage section 6 of the first embodiment is designed to store a predetermined number (for example, 50, 100, etc.) of telephone numbers, and the oldest telephone number which has been stored in the telephone number temporary storage section 6 is deleted when a new telephone number is stored in the telephone number temporary storage section 6 according to FIFO (First-In First-Out) operation.

The telephone number temporary storage section 6 is realized by, for example, FIFO memory (pushup storage). The directory storage section 9 is realized by RAM (Random Access Memory), for example. The display section 8 is realized by, for example, an LCD (Liquid Crystal Display). The signal processing section 4, the control section 5, the counter section 7, the searching section 10 and the directory storage control section 11 can be realized by, for example, a microprocessor unit which is composed of a CPU (Central Processing Unit), ROM (Read Only Memory), RAM, etc., and appropriate software.

Figure 2:
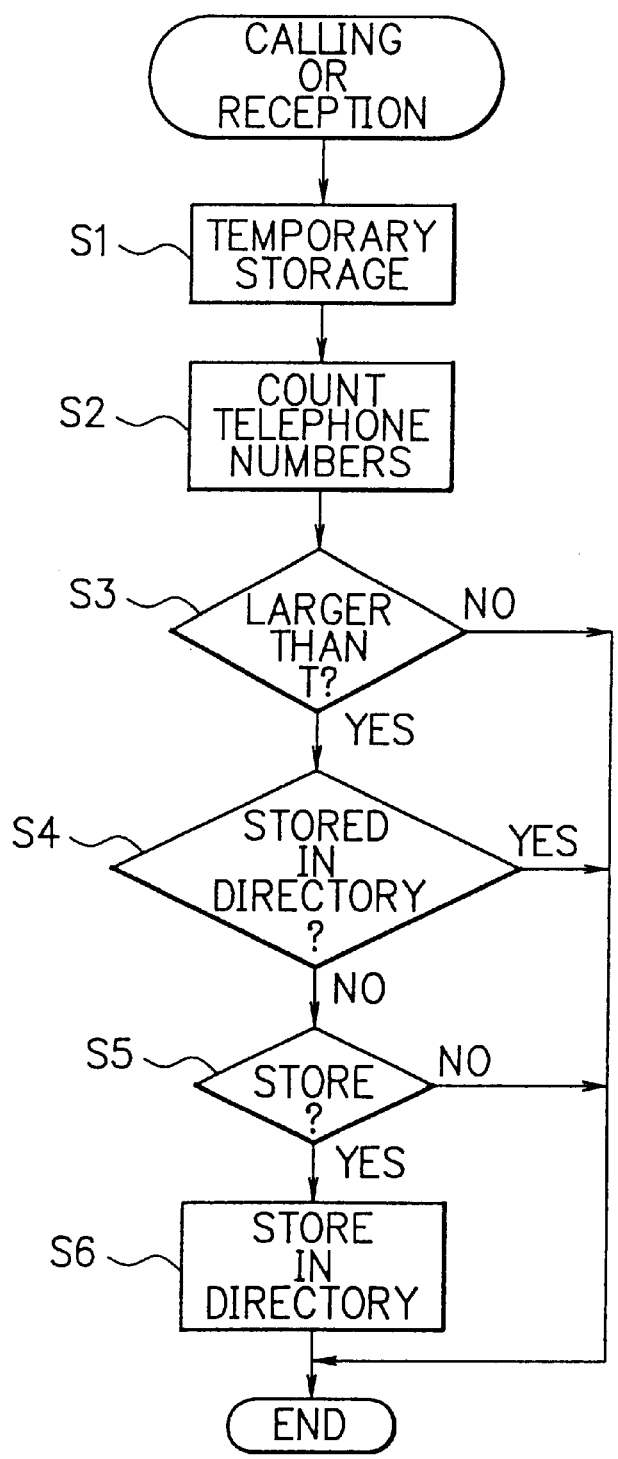
FIG. 2 is a flow chart showing the operation of the directory dialing telephone set of the first embodiment concerning storage of telephone numbers.

In the following, the operation of the directory dialing telephone set according to the first embodiment of the present invention will be described. FIG. 2 is a flow chart showing the operation of the directory dialing telephone set of the first embodiment concerning storage of telephone numbers.

Referring to FIG. 2, when a call is done by the user by dialing a telephone number, the telephone number dialed by the user is supplied to the telephone number temporary storage section 6 via the control section 5. On the other hand, when reception of a call from a calling party occurred, the telephone number of the calling party which is informed by the telephone network according to "calling number identification presentation" etc. is supplied to the telephone number temporary storage section 6 via the reception section 3, the signal processing section 4 and the control section 5. The telephone number temporary storage section 6 which received the telephone number (hereafter, referred to as a "current telephone number") via the control section 5 stores the current telephone number. According to the storing operation, the oldest telephone number which has been stored in the telephone number temporary storage section 6 is deleted according to FIFO operation (step S1).

Subsequently, the counter section 7 reads out data in the telephone number temporary storage section 6 and counts the number of the "current telephone number"s which exist in the telephone number temporary storage section 6. In other words, the counter section 7 determines how many times the "current telephone number" has been stored in the telephone number temporary storage section 6 within the predetermined capacity (50, 100, etc.) of the telephone number temporary storage section 6. After the reading out, the status of the telephone number temporary storage section 6 is restored to the original status before the reading out by the counter section 7 (The data read out from the telephone number temporary storage section 6 is restored in the telephone number temporary storage section 6 by the counter section 7) (step S2).

Subsequently, the control section 5 judges whether or not the number of the current telephone numbers counted by the counter section 7 is larger than a predetermined threshold number T (step S3). If the number of the current telephone numbers in the telephone number temporary storage section 6 is larger than the threshold number T, process proceeds to the next step S4, and otherwise, process is ended without any further operation.

In the step S4, the searching section 10 searches the directory storage section 9 according to an instruction of the directory storage control section 11 and thereby judges whether or not the current telephone number has already been stored in the directory of the directory storage section 9. If the current telephone number has already been stored in the directory, process is ended. If the current telephone number has not been stored in the directory yet, the directory storage control section 11 inquires of the user whether or not the user intends to store the current telephone number in the directory, by displaying an inquiry message on the display section 8 (step S5). If the user intended to store the current telephone number, the user pushes the storage button 12 and the current telephone number is stored in the directory of the directory storage section 9 (step S6). If the used does not intend to store the current telephone number, the storage button 12 is not pushed and process is ended without storing the current telephone number in the directory.

As described above, in the directory dialing telephone set according to the first embodiment of the present invention, a telephone number dialed by the user for calling or a telephone number of the calling party which is informed by the telephone network according to a service such as calling number identification presentation etc. is stored one by one in the telephone number temporary storage section 6 which can store a predetermined number of telephone numbers. The number of the current telephone numbers that exist in the telephone number temporary storage section 6 is counted by the counter section 7, and the inquiry to the user (asking the user whether or not the user intends to store the current telephone number in the directory of the directory storage section 9) is executed only in the case where the number of the current telephone numbers stored in the telephone number temporary storage section 6 is larger than a predetermined threshold number T and the current telephone number has not been stored in the directory storage section 9 yet. The current telephone number is stored in the directory of the directory storage section 9 if the user requested to store the current telephone number by pushing the storage button 12.

The inquiry is not executed with regard to telephone numbers that are rarely dialed by the user nor with regard to telephone numbers of calling parties who rarely calls the directory dialing telephone set of the user. Therefore, the user is released from troublesome operation such as being inquired and pushing a button with regard to telephone numbers that will not be registered, and thus the user can register necessary telephone numbers in the directory of the directory storage section 9 efficiently and with a minimum of effort.

Incidentally, it is also possible to design the directory dialing telephone set of the first embodiment so that the user can also store the current telephone number in the directory of the directory storage section 9 even when the inquiry is not executed by the directory dialing telephone set, by pushing the storage button 12 etc.

Figure 3:
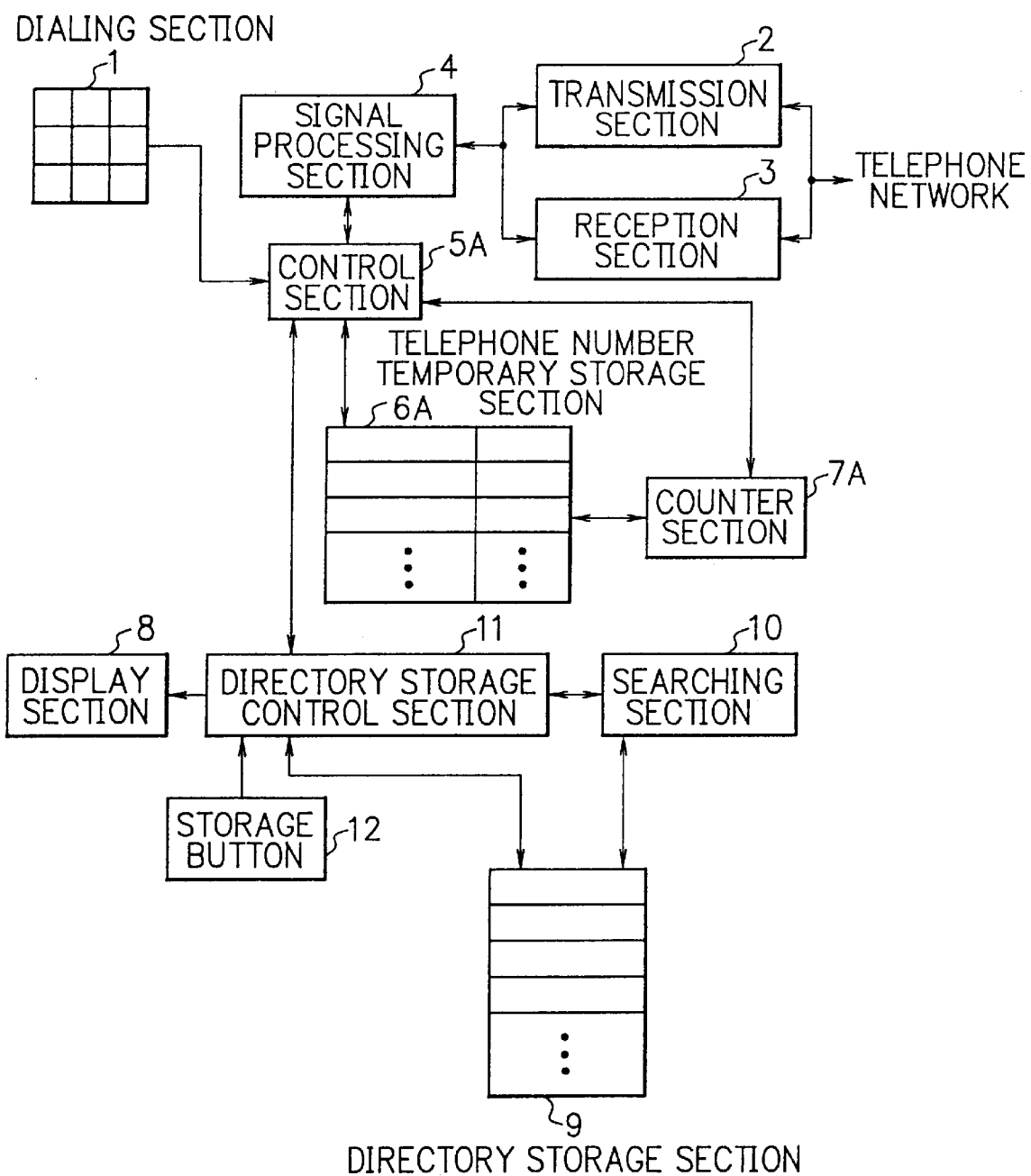
FIG. 3 is a block diagram showing functional blocks of a directory dialing telephone set of the first embodiment concerning storage of telephone numbers.

FIG. 3 is a block diagram showing functional blocks of a directory dialing telephone set according to a second embodiment of the present invention concerning storage of telephone numbers. The directory dialing telephone set of the second embodiment comprises a dialing section 1 composed of push buttons etc. for letting the user dial telephone numbers, a transmission section 2 for transmitting a telephone number which has been dialed (pushed or selected) by the user into the telephone network, a reception section 3 for receiving a telephone number which has been informed by the telephone network, a signal processing section 4 for executing procedures concerning telephone numbers on calling and reception etc., a control section 5A for controlling components of the directory dialing telephone set, a telephone number temporary storage section 6A for temporarily storing telephone numbers which have been dialed by the user and telephone numbers of calling parties which have been informed by the telephone network and time stamps (the date and time) concerning the telephone numbers, a counter section 7A for counting the number of time stamps concerning a telephone number by referring to the telephone number temporary storage section 6A, a display section 8 for displaying information such as a telephone number on calling or reception, an inquiry to the user, etc., a directory storage section 9 for storing a directory including a plurality of telephone numbers, a searching section 10 for searching the directory storage section 9, a directory storage control section 11 for executing control concerning storage of telephone numbers in the directory storage section 9, and a storage button 12 for receiving an instruction of the user to store the telephone number in the directory storage section 9.

The telephone number temporary storage section 6A of the second embodiment is designed to store a plurality of telephone numbers and time stamps (the date and time) concerning each of the telephone numbers, during a predetermined period. The telephone numbers and the time stamps stored in the telephone number temporary storage section 6A is updated by the control section 5A periodically (once in a day, for example). In the update, time stamps which have passed the aforementioned predetermined period are deleted from the telephone number temporary storage section 6A, and telephone numbers whose latest time stamp has passed the aforementioned predetermined period are deleted from the telephone number temporary storage section 6A. In other words, the telephone number temporary storage section 6A stores time stamps which have not passed the aforementioned predetermined period since storing and telephone numbers whose latest time stamp has not passed the aforementioned predetermined period since storing.

The telephone number temporary storage section 6A and the directory storage section 9 are realized by RAM, for example. The signal processing section 4, the control section 5A, the counter section 7A, the searching section 10 and the directory storage control section 11 can be realized by, for example, a microprocessor unit which is composed of a CPU, ROM, RAM, etc., and appropriate software.

Figure 4:
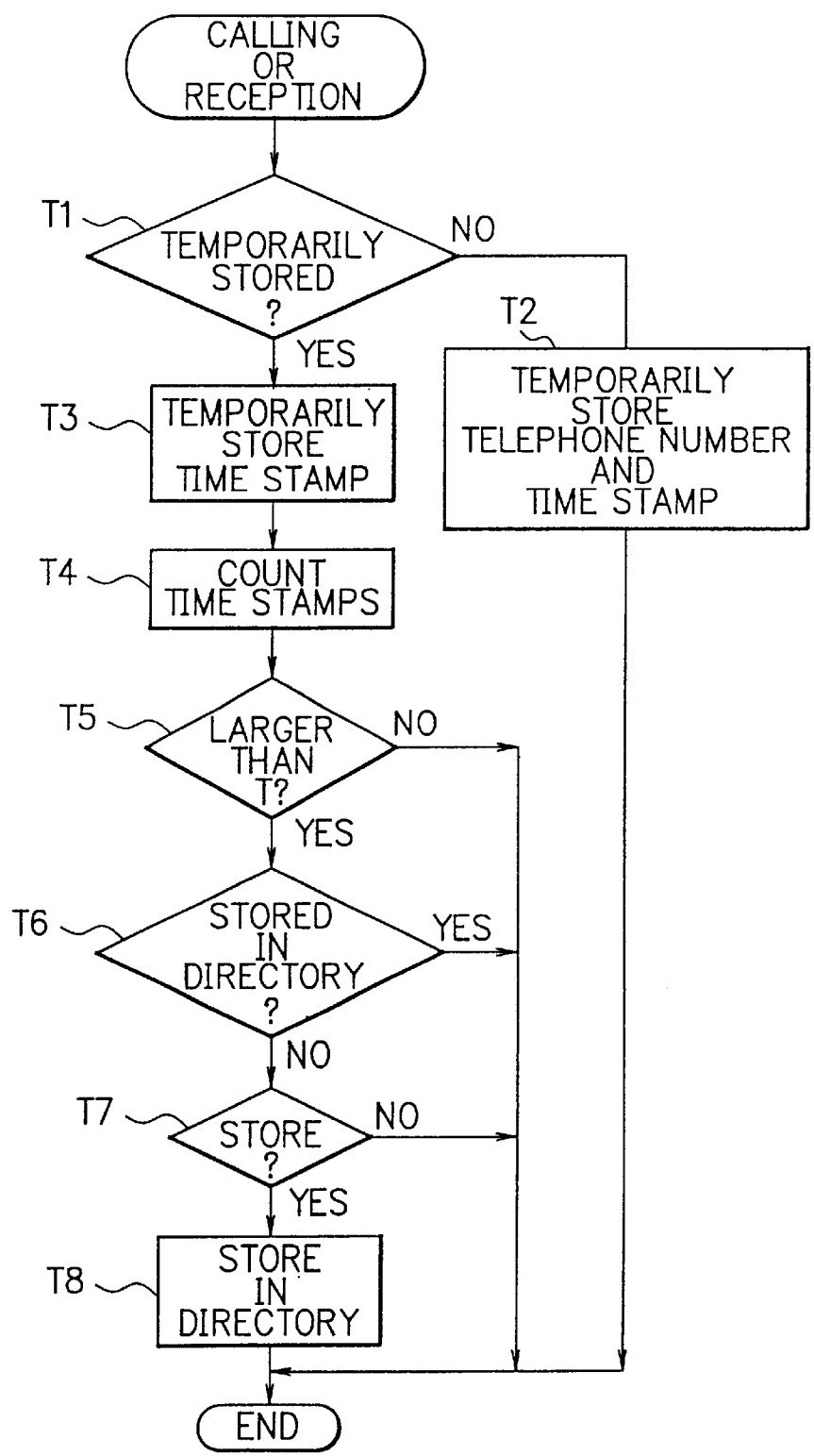
FIG. 4 is a flow chart showing the operation of the directory dialing telephone set of the second embodiment concerning storage of telephone numbers.

In the following, the operation of the directory dialing telephone set according to the second embodiment of the present invention will be described. FIG. 4 is a flow chart showing the operation of the directory dialing telephone set of the second embodiment concerning storage of telephone numbers.

Referring to FIG. 4, when a call is done by the user by dialing a telephone number, the telephone number dialed by the user (i.e. the current telephone number) is supplied to the control section 5A. On the other hand, when reception of a call from a calling party occurred, the telephone number of the calling party informed by the telephone network according to calling number identification presentation etc. (i.e. the current telephone number) is supplied to the control section 5A via the reception section 3 and the signal processing section 4.

Subsequently, the counter section 7A refers to the telephone number temporary storage section 6A and judges whether or not the current telephone number exists in the telephone number temporary storage section 6A (step T1). If the current telephone number does not exist in the telephone number temporary storage section 6A, the control section 5A stores the current telephone number and a time stamp (the date and time) concerning the current telephone number in the telephone number temporary storage section 6A (step T2), and process is ended.

If the current telephone number exists in the telephone number temporary storage section 6A, the control section 5A stores a time stamp (the date and time) concerning the current telephone number in the telephone number temporary storage section 6A (step T3).

Subsequently, the counter section 7A refers to the telephone number temporary storage section 6A and counts the number of time stamps concerning the current telephone number which exist in the telephone number temporary storage section 6A. In other words, the counter section 7 determines how many telephone calls (calling and reception) concerning the current telephone number have been occurred during the aforementioned predetermined period (step T4).

Subsequently, the control section 5A judges whether or not the number of the time stamps counted by the counter section 7A is larger than a predetermined threshold number T (step T5). If the number of the time stamps counted by the counter section 7A is larger than the threshold number T, process proceeds to the next step T6, and otherwise, process is ended without any further operation.

In the step T6, the searching section 10 searches the directory storage section 9 according to an instruction of the directory storage control section 11 and thereby judges whether or not the current telephone number has already been stored in the directory of the directory storage section 9. If the current telephone number has already been stored in the directory, process is ended. If the current telephone number has not been stored in the directory yet, the directory storage control section 11 inquires of the user whether or not the user intends to store the current telephone number in the directory, by displaying an inquiry message on the display section 8 (step T7). If the user intended to store the current telephone number, the user pushes the storage button 12 and the current telephone number is stored in the directory of the directory storage section 9 (step T8). If the used does not intend to store the current telephone number, the storage button 12 is not pushed and process is ended without storing the current telephone number in the directory.

As described above, in the directory dialing telephone set according to the second embodiment of the present invention, a telephone number dialed by the user for calling or a telephone number of the calling party which is informed by the telephone network according to a service such as calling number identification presentation etc. (i.e. the current telephone number) and a time stamp concerning the current telephone number are stored in the telephone number temporary storage section 6A and process is ended, if the current telephone number does not exist in the telephone number temporary storage section 6A, that is, if the current telephone number has not been stored in the telephone number temporary storage section 6A yet or the current telephone number has been deleted from the telephone number temporary storage section 6A by the update of the telephone number temporary storage section 6A which is executed by the control section 5A. If the current telephone number existed in the telephone number temporary storage section 6A, a time stamp is added to the current telephone number stored in the telephone number temporary storage section 6A. Storage of the time stamps in the telephone number temporary storage section 6A can be executed according to any method that can at least link the time stamps with a corresponding telephone number. The number of the time stamps concerning the current telephone number which have been stored in the telephone number temporary storage section 6A is counted by the counter section 7A, and the inquiry to the user (asking the user whether or not the user intends to store the current telephone number in the directory of the directory storage section 9) is executed only in the case where the number of the time stamps counted by the counter section 7A is larger than a predetermined threshold number T and the current telephone number has not been stored in the directory storage section 9 yet. The current telephone number is stored in the directory of the directory storage section 9 if the user requested to store the current telephone number by pushing the storage button 12.

Therefore, the inquiry is not executed with regard to telephone numbers that are rarely dialed by the user nor with regard to telephone numbers of calling parties who rarely calls the directory dialing telephone set of the user. The user is released from the troublesome operation with regard to telephone numbers that will not be registered, and thus the user can register necessary telephone numbers in the directory of the directory storage section 9 efficiently and with a minimum of effort, in the same way as the first embodiment.

Incidentally, similarly to the first embodiment, it is also possible to design the directory dialing telephone set of the second embodiment so that the user can also store the current telephone number in the directory of the directory storage section 9 even when the inquiry is not executed by the directory dialing telephone set, by pushing the storage button 12 etc.

As set forth hereinabove, in the directory dialing telephone sets according to the present invention, the inquiry for asking the user whether or not the user intends to store the current telephone number in the directory is executed only in the case where telephone calls (calling and reception) concerning the current telephone number have been occurred more frequently than a predetermined frequency. Therefore, the user is released from the troublesome tasks such as being inquired and pushing a button with regard to telephone numbers that will not be registered. The user can register necessary telephone numbers in the directory of the directory storage section efficiently and with a minimum of effort.

Incidentally, while the directory dialing telephone set described above handled telephone numbers which are dialed by the user for calling and telephone numbers of calling parties which are informed by the telephone network (when the directory dialing telephone set of the user receives calls) according to a service such as calling number identification presentation etc., it is also possible to let the directory dialing telephone set according to the present invention handle telephone numbers of calling parties which are informed (transmitted) by telephone sets of calling parties when the directory dialing telephone set of the user receives calls, telephone numbers of calling parties which are informed by the telephone network or telephone sets of calling parties during conversation, etc., in the same way.

Such telephone numbers of calling parties will be referred to as "telephone numbers informed via the telephone network" in the following claims.

In addition, while the directory storage control section 11 executed the inquiry to the user (asking the user whether or not the user intends to store the current telephone number in the directory of the directory storage section 9) in the case where frequency of telephone calls (calling and reception) concerning the current telephone number is high and the current telephone number has not been stored in the directory storage section 9 yet, it is also possible to let the directory dialing telephone set according to the present invention store the current telephone number without executing the inquiry, after confirming that the frequency of telephone calls concerning the current telephone number is high and that the current telephone number has not been stored in the directory storage section 9 yet.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A directory dialing telephone set which is provided with a directory storage means for storing a directory including a plurality of telephone numbers and which has functions for executing dialing of a telephone number which has been selected by the user from the telephone numbers stored in the directory storage means, comprising:

a telephone number temporary storage means for temporarily storing a predetermined number of telephone numbers which have been dialed by the user and telephone numbers of calling parties which have been informed via the telephone network;

a counter means for counting the number of times of storage of a current telephone number, which have just been dialed by the user or informed via the telephone network, that exist in the telephone number temporary storage means;

a searching means for searching the directory storage means for the current telephone number and judging whether or not the current telephone number has already been stored in the directory of the directory storage means; and a directory storage control means for executing control concerning storage of the current telephone number in the directory of the directory storage means if the number of times which has been counted by the counter means is larger than a predetermined threshold number and the searching means judged that the current telephone number has not been stored in the directory of the directory storage means yet.

2. A directory dialing telephone set as claimed in claim 1, wherein the directory storage control means inquires of the user whether or not the user intends to store the current telephone number in the directory of the directory storage means if the number of times which has been counted by the counter means is larger than a predetermined threshold number and the searching means judged that the current telephone number has not been stored in the directory of the directory storage means yet, and stores the current telephone number in the directory of the directory storage means if the user requested to store the current telephone number.

3. A directory dialing telephone set as claimed in claim 1, wherein the directory storage control means stores the current telephone number in the directory of the directory storage means if the number of times which has been counted by the counter means is larger than a predetermined threshold number and the searching means judged that the current telephone number has not been stored in the directory of the directory storage means yet.

4. A directory dialing telephone set which is provided with a directory storage means for storing a directory including a plurality of telephone numbers and which has functions for executing dialing of a telephone number which has been selected by the user from the telephone numbers stored in the directory storage means, comprising:

a telephone number temporary storage means for temporarily storing telephone numbers which have been dialed by the user, telephone numbers of calling parties which have been informed via the telephone network, and time stamps concerning the telephone numbers;

an update means for updating the telephone numbers and the time stamps stored in the telephone number temporary storage means so as to delete telephone numbers and time stamps which have passed a predetermined period;

a counter means for counting the number of time stamps concerning a current telephone number, which have just been dialed by the user or informed via the telephone network, that exist in the telephone number temporary storage means;

a searching means for searching the directory storage means for the current telephone number and judging whether or not the current telephone number has already been stored in the directory of the directory storage means; and a directory storage control means for executing control concerning storage of the current telephone number in the directory of the directory storage means if the number of time stamps which has been counted by the counter means is larger than a predetermined threshold number and the searching means judged that the current telephone number has not been stored in the directory of the directory storage means yet.

5. A directory dialing telephone set as claimed in claim 4, wherein the directory storage control means inquires of the user whether or not the user intends to store the current telephone number in the directory of the directory storage means if the number of time stamps which has been counted by the counter means is larger than a predetermined threshold number and the searching means judged that the current telephone number has not been stored in the directory of the directory storage means yet, and stores the current telephone number in the directory of the directory storage means if the user requested to store the current telephone number.

6. A directory dialing telephone set as claimed in claim 4, wherein the directory storage control means stores the current telephone number in the directory of the directory storage means if the number of time stamps which has been counted by the counter means is larger than a predetermined threshold number and the searching means judged that the current telephone number has not been stored in the directory of the directory storage means yet.

* * * * *